United States Patent [19]

Childs

[11] Patent Number: 5,023,945
[45] Date of Patent: Jun. 11, 1991

[54] TRANSMISSION SYSTEM USING PARALLEL OPTIC LINKS TO ACHIEVE ENHANCED DYNAMIC RANGE

[75] Inventor: Richard B. Childs, Harvard, Mass.

[73] Assignee: GTE Laboratories Incorporated, Waltham, Mass.

[21] Appl. No.: 454,679

[22] Filed: Dec. 21, 1989

[51] Int. Cl.$^5$ ............................................ H04B 10/00
[52] U.S. Cl. ...................... 455/617; 370/74; 455/618
[58] Field of Search ............... 455/617, 602, 612, 616, 455/609, 618; 370/74, 118, 2; 250/551

[56] References Cited

U.S. PATENT DOCUMENTS

| | | | |
|---|---|---|---|
| 3,290,504 | 12/1966 | Vallese et al. | 455/617 |
| 3,666,956 | 5/1972 | von Willisen | 455/617 |
| 4,075,474 | 2/1978 | Straus et al. | 455/602 |
| 4,292,551 | 9/1981 | Kolmann | 250/551 |
| 4,393,518 | 7/1983 | Briley | 455/617 |
| 4,504,974 | 3/1985 | Rademaker | 455/602 |

FOREIGN PATENT DOCUMENTS

| | | | |
|---|---|---|---|
| 0106247 | 7/1982 | Japan | 455/617 |
| 0215136 | 12/1984 | Japan | 455/617 |

OTHER PUBLICATIONS

Electronic Circuits and Systems, Apr. 1977, vol. 1, No. 3, Hoffman et al., pp. 95–98.
William H. Lambert, "Second-Order Distortion in CATV Push–Pull Amplifiers", Proc. of the IEEE, vol. 58, No. 7 (1970), pp. 1057–1062.

Primary Examiner—Reinhard J. Eisenzopf
Assistant Examiner—Kinfe-Michael Negash
Attorney, Agent, or Firm—Victor F. Lohmann, III

[57] ABSTRACT

An optical transmission system includes a power splitter for dividing an RF input signal into a plurality of intermediate signals each assigned to a respective one of a plurality of parallel optic links. Each link optically transmits its respective intermediate RF signal over a respective fiber line before being detected at a receiver end. The detected signals are combined by an RF power combiner into an output signal having an enhanced signal to noise ratio that is better by 10 log n dB over that of a single link, where n is the number of parallel links. In order to permit operation at arbitrarily high frequencies, a pilot tone delay equalization circuit is coupled to each link at the receiver end for equalizing the delay variations between the various fiber paths.

14 Claims, 3 Drawing Sheets

TRANSMISSION SYSTEM USING PARALLEL OPTIC LINKS TO ACHIEVE ENHANCED DYNAMIC RANGE

BACKGROUND OF THE INVENTION

The dynamic range of any analog fiber optic link is fundamentally limited by shot noise. For shot noise or quantum limited detection, it is well known that the signal to noise ratio, and hence the dynamic range, increases with the square root of the received optical power. For some applications, such as antenna-to-receiver Radio Frequency (RF) links, the dynamic range requirements are such that the required optical source power exceeds that available from a diode laser. Other noise sources present in practical optical links further degrade the signal to noise ratio.

OBJECTS OF THE PRESENT INVENTION

It is a primary object of the present invention to obviate the above-noted and other disadvantages of the prior art.

It is a further object of the present invention to provide an optical transmission system having a plurality of parallel optic links which achieve an enhanced signal to noise ratio over that of a single optic link.

It is a further object of the present invention to provide a novel delay equalization circuit located at the receiver end of each of a plurality of parallel optic links for equalizing the time delay among the detected signals, thereby allowing operation at arbitrarily high frequencies.

SUMMARY OF THE INVENTION

In one aspect of the present invention, an optical transmission system includes at a transmitter end a splitter means for dividing an RF input signal into a plurality of intermediate signals each assigned to a respective optical link. Each of the links includes a generator means for generating an optical signal representative of the respective RF intermediate signal, an optical pathway means for guiding the optical signal, and a detector means at the receiver end for performing optical detection. The detected signal from each optical link is coupled to a combiner means which provides an RF output signal having enhanced dynamic range.

In another aspect of the present invention, each of the links includes a closed-loop delay equalization control circuit coupled to the detector means of said respective link for equalizing the time delay of the detected signal with that of the other detected signals. Operation of the control system requires a means for adding a pilot tone to the RF input signal. The closed-loop system includes a phase detector circuit responsive to the pilot tone for generating a control voltage proportional to the phase difference between the pilot tone and a common phase reference signal. A controller responds to the control voltage and adjusts an electronic delay control means to minimize the phase detector output voltage so that the delay variations between the detected signals are equalized.

DETAILED DESCRIPTION OF THE PREFERRED EMBODIMENTS

The present invention is concerned with improving the dynamic range of a single fiber optic link by dividing an RF input signal into a plurality of intermediate signals that are transmitted in parallel over respective fiber optic links before being individually detected and subsequently combined at a receiver end. The signal summation at the receiver end is accomplished with an RF power combiner, and provides an RF output signal having an enhanced signal to noise ratio in comparison to that of a single optical link. The present invention further includes a novel delay control circuit at the receiver end of each parallel link for equalizing the time-delay of the detected signal with the time-delay of the detected signals in the other parallel optic links.

Figure 1:
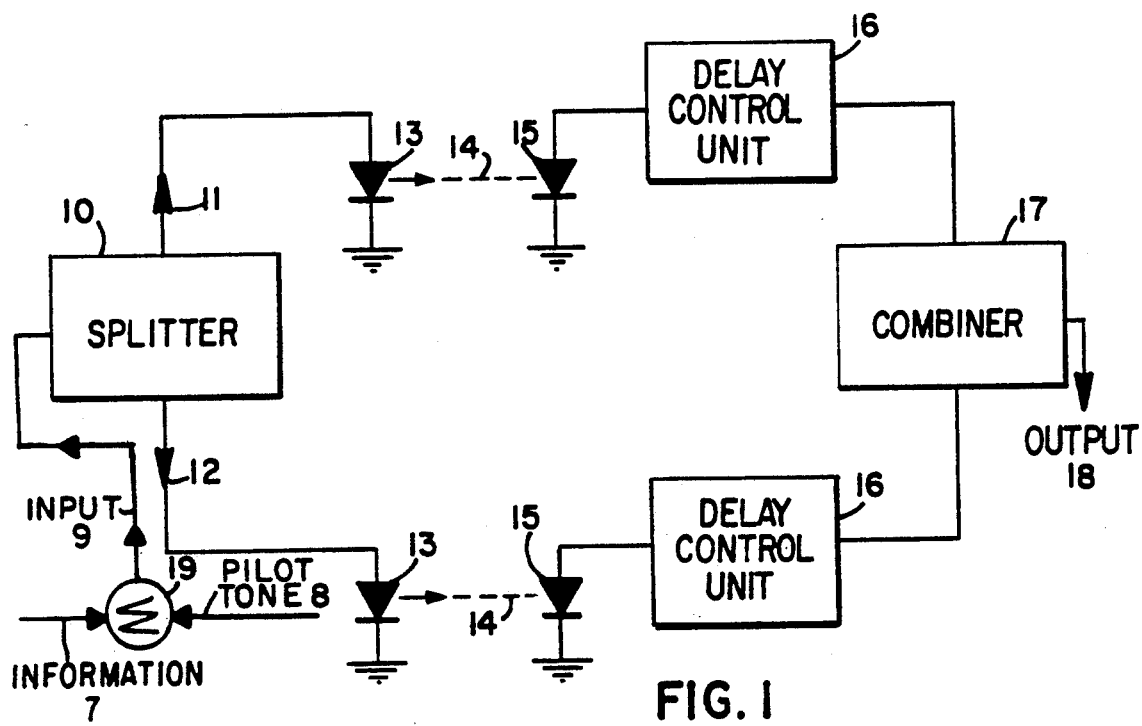
FIG. 1 a block diagram of an optical transmission system in accordance with the present invention wherein an input signal travels over at least two parallel fiber links before being at the receiver end.

FIG. 1 is a block diagram of an optical transmission system constructed in accordance with the present invention, and shows two parallel links for exemplary purposes to illustrate the operation of the system. As indicated, an RF input signal 9 enters a power splitter 10 and is divided equally between two intermediate signals 11 and 12. The intermediate signal 11 is coupled to a laser 13 which generates an optical signal representative of the electrical signal. The optical signal is then transmitted over an optical pathway means 14, such as fiber, and is detected by a photodiode 15 at the receiver end. Likewise, the intermediate electrical signal 12 is converted to an optical signal by laser 13, coupled to an optical pathway means 14, and then detected by photodiode 15. Hereinafter, the interconnection of laser 13, optical pathway means 14, and photodiode 15 along a given signal path will be referred to as a parallel optic link, where the common numbering among the elements in each of the parallel links reflects the identical construction of the links. Although the discussion of FIG. 1 concerns two parallel links, this should not serve as a limitation of the present invention since the system is clearly expandable to include a plurality of parallel optic links.

The optical signals propagating along the optical pathway means arrive at the receiver end of their respective links at different times when the optical pathway means are fiber lines of unequal length. In order to equalize the time delay among the detected signals, and thus bring the signals in-phase with one another before being combined, the output from each photodiode 15 is coupled to a delay control unit 16 which imposes the appropriate time delay on the detected signal. Further details of the delay control unit 16 will accompany the discussion hereinbelow of FIGS. 2 and 3. The time-delayed signals from the delay unit 16 in each parallel link are summed with an RF power combiner 17 and appear as a single RF output signal 18 having enhanced signal to noise ratio.

The RF output signal 18 resulting from the summation of the in-phase detected signals exhibits a 3 dB increase in signal amplitude since the signal carried by each link is correlated. Advantageously, the uncorrelated noise sources do not increase in amplitude. This enhancement in signal to noise ratio is thus 3 dB better than that obtainable by a single link. A similar signal to noise enhancement occurs if resistive (lossy) summing is used after amplification of each individual photodetector output. As noted above, the present invention can be extended to include an arbitrary number of parallel optic links with suitable RF splitters and summers to provide a signal to noise enhancement over a single link. In general, this enhancement is quantitatively measured as $$EF = 10 \log n,$$

where
EF = enhancement factor, and
n = number of parallel combined links.

Thus, any signal to noise ratio can be obtained using the appropriate number of parallel optic links.

As mentioned above, the detected signal output from each photodiode 15 is time-delayed by a delay control unit 16 before being coupled to combiner 17. The reason is that in order to achieve the enhancement in signal to noise ratio, all separate optical pathway means 14 must have delay times which are equal within a small fraction of the period (1/F) of the highest signal frequency (F) of interest. In accordance with another aspect of the invention, the delay control unit 16 performs active delay equalization with a novel pilot tone phase detecting delay equalization circuit (hereinafter referred to as pilot tone equalization circuit) to allow operation at arbitrarily high frequency. The novel pilot tone equalization circuit is represented in FIG. 2 as the closed-loop system consisting of electronic delay control 21, a pilot tone phase detector circuit 22, and a controller 23.

Operation of the pilot tone equalization circuit 16 initially requires that a pilot tone be added to the input signal 9 to produce a composite signal which is then coupled to splitter 10. Consequently, the spectrum of optical signal 20 which is coupled from optical pathway means 14 to photodiode 15 in each parallel link includes the information input signal 9 and the pilot tone. In a first pass through the equalization circuit 16, the detected signal is time-delayed by electronic delay control 21 and then coupled to pilot tone phase detector circuit 22, where the pilot tone is removed from the composite detected signal and phase detected to yield a control voltage proportional to the delay time of the respective parallel optic link.

The controller 23 serves as a feedback mechanism in the closed-loop system for responding to the control voltage and continuously adjusting the electronic delay control 21 until the time delay is minimized. The pilot tone equalization circuit in each link operates in cooperation with the other circuits to equalize the delay times of the individual optical links as measured by the phase of the individually detected pilot tones. The controller 23 can be implemented as a normal continuous feedback control loop, or as a microprocessor which samples the individual phase detector outputs of each link. The electronic delay control 21 could be a motor driven line stretcher (trombone), electronically switched fixed length transmission lines, or other electronically or electromechanically controlled delay line.

Figure 2:
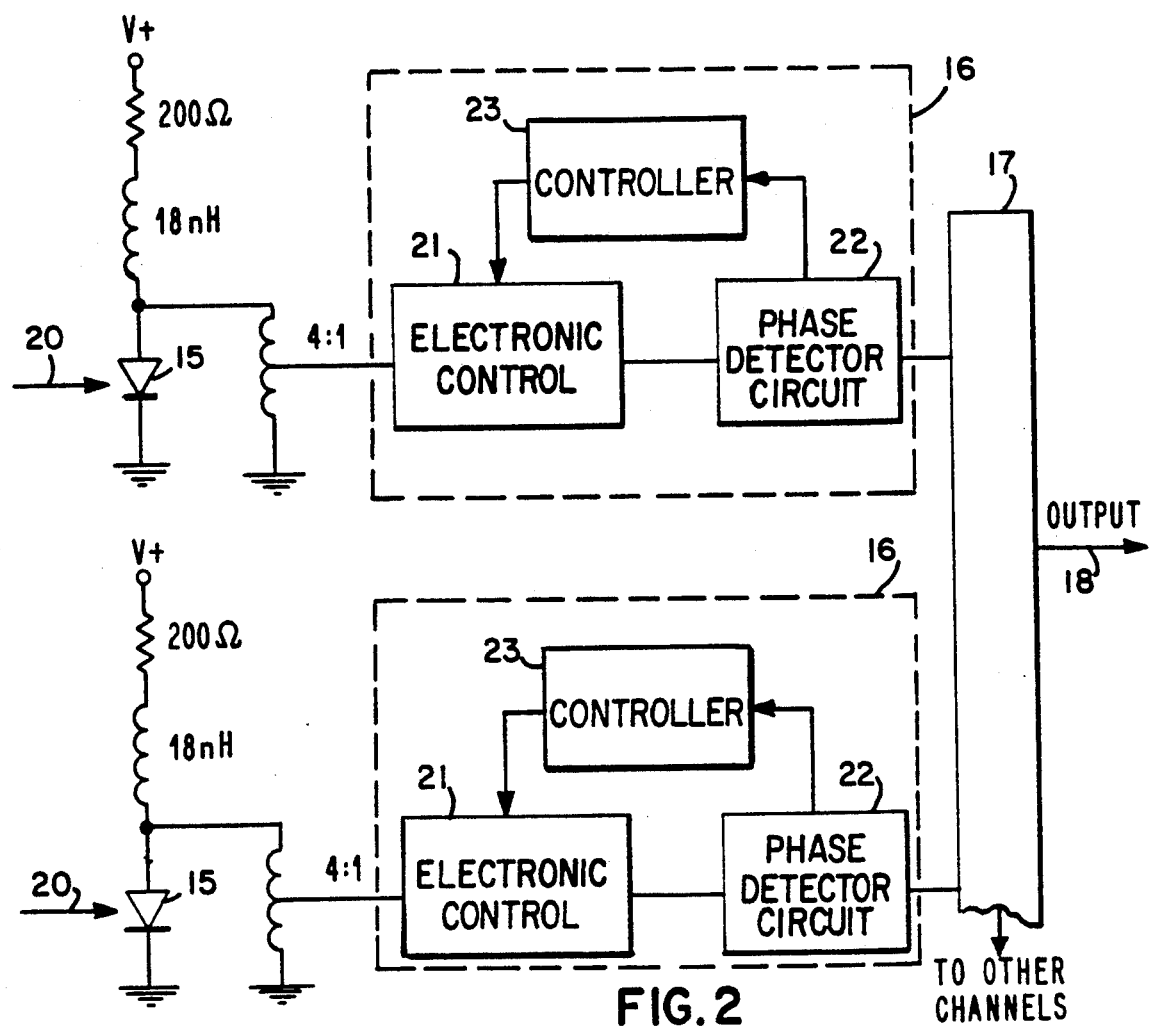
FIG. 2 is a block diagram of the receiving end in FIG. 1 showing the delay control unit in more detail.
Figure 3:
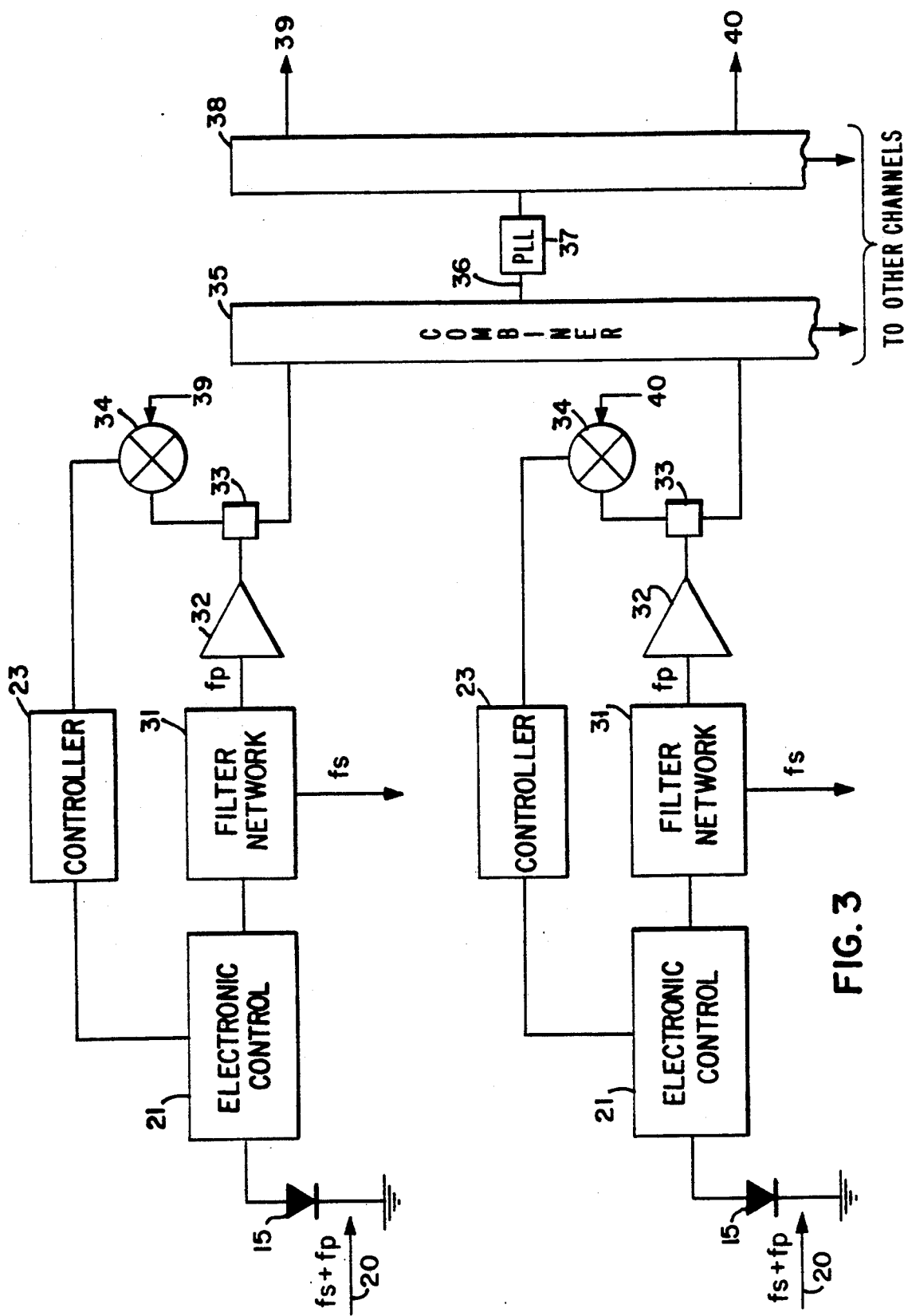
FIG. 3 is a block diagram of a novel pilot tone equalization circuit corresponding to the delay control unit of FIG. 2.

One possible implementation of the pilot tone equalization circuit according to the present invention is shown in FIG. 3 where the elements designated by numerals 31, 32, 33, and 34 represent a single integrated unit corresponding functionally to the pilot tone phase detector circuit 22 in FIG. 2. FIG. 3 schematically illustrates how delay equalization is achieved between two pilot tone equalization circuits each coupled to a respective parallel link. To maintain consistency among the drawings, identically numbered items in FIGS. 2 and 3 represent the same component or subsystem.

As shown, the optical signal 20 includes signals $f_s$ (input information signal) and $f_p$ (pilot tone). After signal 20 is detected by photodiode 15, the pilot tone is removed from the detected signal with a filter network 31, amplified by amplifier 32, and then split into two intermediate tone signals by splitter 33. Although not shown, signal $f_s$ is routed to combiner 17 in FIG. 1. Combiner 35 receives one intermediate pilot tone signal from each parallel link, and sums these signals to produce a phase reference signal present on combiner output 36. A phase locked loop (PLL) 37 can be used to remove noise from the phase reference if desired. The phase reference signal is distributed by splitter 38 to a phase detector 34 in each link where it serves as an input signal along with the other intermediate pilot tone from splitter 33. Phase detector 34 produces an output voltage proportional to the phase difference between the pilot tone of the respective link and the phase reference signal. The controller 23 responds to the phase detector voltage and adjusts the electronic delay control accordingly to minimize the phase detector output voltage. In this manner, delay variations between the various optical pathway means are equalized so that the information signal $f_s$ from each link is combined in-phase with the other information signals. Although the phase reference signal mentioned above is the average of the pilot tones from each link, the signal may also be an individual pilot tone from a selected one of the links.

Figure 4:
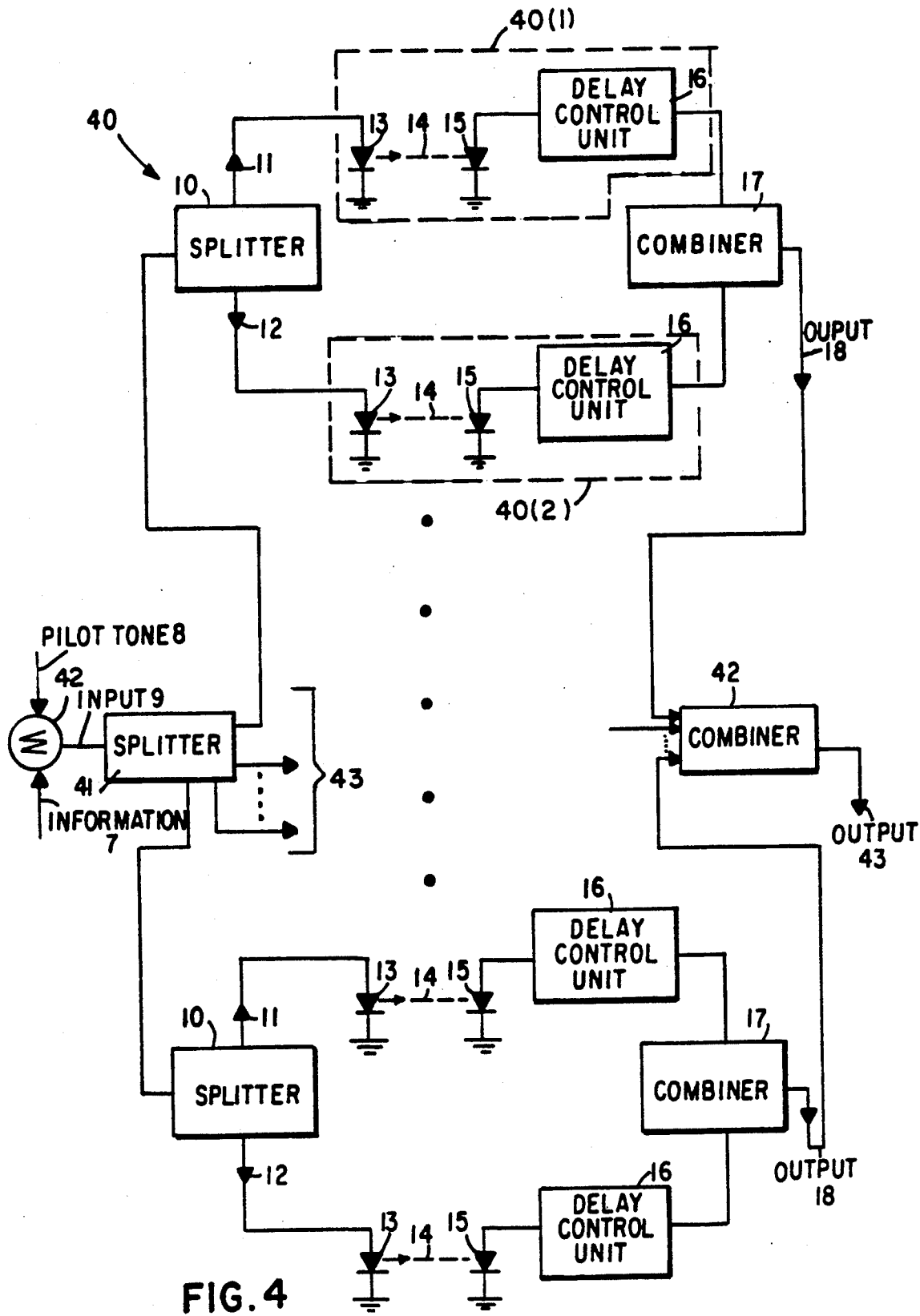
FIG. 4 is a block diagram of an optical transmission system in accordance with the present invention where optic links are grouped into pairs each operating in a push-pull configuration.

In addition to the enhanced dynamic range, a significant reduction in even order distortion products is possible with the transmission system shown in FIG. 4 by grouping the plurality of parallel optic links into exemplary link pairs 40 each including two parallel links 40(1) and 40(2), and operating each link pair in a push-pull configuration. The push-pull operation is characterized in that one of the links 40(1) in a pair is driven 180° out of phase with respect to the other link 40(2) in the pair. A mathematical model of a push-pull amplifier design is presented by W. H. Lambert in "Second-Order Distortion in CATV Push-Pull Amplifiers", Proceedings of the IEEE, Vol. 58, No. 7, 1970. The following discussion proposes several configurations to implement the push-pull operation, and refers illustratively to FIG. 4 where the two parallel links 40(1) and 40(2) serve as a link pair 40 where the common numbering between FIG. 4 and FIG. 1 reflects a similarity of components/subsystems.

The two links in FIG. 1 may be driven out of phase with respect to one another by using a 180° degree hybrid junction splitter 10 or suitable transformer (balun). The detected out-of-phase signals would then be brought back in-phase with a 180° degree combiner 17, or by performing signal inversion by reversing the polarity of one of the photodiodes 15 in the link pair and then using an in-phase power combiner 17. Another configuration would use an in-phase power splitter, a photodiode with reverse polarity relative to the other photodiode in the pair, and a 180° power combiner. In each of the alternate configurations above, the combined RF signal from each balanced pair is summed with the RF output signal from each other pair to produce a single output signal having both enhanced dynamic range and improved linearity.

What is claimed:

1. An optical transmission system for improving signal to noise ratio, comprising:
   summation means for additively combining a pilot tone with an electrical input information signal to produce a composite electrical signal;
   splitter means adapted to receive said composite signal and divide signals each coupled to a respective one of a plurality of optical links;
   each of said optical links including:
      generator means adapted to receive said respective intermediate signal and generate an optical signal representative of said respective intermediate signal,
      optical pathway means coupled to the generator means of said one optical link for guiding said respective optical signal wherein said optical pathway means has an associated signal propagation delay time,
      detector means adapted to receive the guided optical signal from the optical pathway means of said respective optical link and generate a detected electrical signal representative of said guided optical signal wherein said respective detected signal has an associated phase shift component proportional to the propagation delay time of said respective optical pathway means, and
      a delay equalization circuit adapted to receive the detected signal from the detector means of said one optical link and equalize the phase shift component of said detected signal with the phase shift component of each detected signal in each remaining optical link of said plurality of optical links; and
   means adapted to receive the equalized detected signal from the respective delay equalization circuit of each optical link and combine said equalized detected signals into a single output signal.

2. The optical transmission system as recited in claim 1 further including in each of said delay equalization circuits:
   a closed-loop control system comprising:
   an electronic delay control means having a signal input for receiving the detected signal from said respective detector means, a control input for controlling a time delay of said detected signal, and an output for providing a time-delayed version of said detected signal;
   a filter network coupled to said delay control means for receiving the time-delayed detected signal and filtering out the pilot tone from the detected signal;
   a phase detector responsive to a phase reference signal and the pilot tone from said filter network for producing an output voltage proportional to the phase difference between said pilot tone and said phase reference; and
   a feedback controller responsive to said phase detector output voltage for providing a control signal to the control input of said electronic delay control means for continuously adjusting the time delay of said detected signal until the phase difference between said pilot tone and said phase reference reaches a desired value.

3. The optical transmission system as recited in claim 2 further including:
   in each of said delay equalization circuits, splitter means coupled to said respective filter network for splitting said pilot tone into two intermediate pilot tones; and
   a combiner for receiving one of said intermediate pilot tones from the respective filter network of each of said delay equalization circuits and providing said phase reference signal as the summation of said one intermediate tones.

4. The optical transmission system as recited in claim 2 wherein:
   said phase reference signal is the pilot tone from the respective filter network of a selected one of said optical links.

5. A system of closed-loop control circuits each coupled to a receiver end of a respective one of a plurality of parallel optical paths wherein each path provides a composite signal including an information signal and pilot tone, each of said control circuits comprising:
   an electronic delay control means having a signal input for receiving the composite signal from said respective path, a control input for controlling a time delay of said composite signal, and an output for providing a time-delayed version of said composite signal;
   a filter network coupled to said delay control means for receiving the time-delayed composite signal and filtering out the tone from the composite signal;
   a phase detector responsive to a phase reference signal and the pilot tone from said filter network for producing an output voltage proportional to the phase difference between said pilot tone and said phase reference; and
   a feedback controller responsive to said phase detector output voltage for providing a control signal to the control input of said electronic delay control means for continuously adjusting the time-delay of said composite signal until the phase difference between said pilot tone and said phase reference reaches a desired valve.

6. The system of control circuits as recited in claim 5 further including:
   in each of said control circuits, splitter means coupled to said respective filter network for splitting said pilot tone into two intermediate pilot tones; and
   a combiner for receiving one of said intermediate pilot tones from each of said control circuits and combining said intermediate pilot tones to produce said phase reference signal.

7. The optical transmission system as recited in claim 5 wherein:
   said reference signal is the pilot tone from a selected one of said links.

8. An optical transmission system for improving signal to noise ratio, comprising:
   summation means for additively combining a pilot tone with an electrical input information signal to produce a composite electrical signal;
   input splitter means adapted to receive said composite signal and divide said composite signal into a plurality of equivalent intermediate composite signals;
   a plurality of signal splitter means each adapted to receive a respective one of said equivalent intermediate composite signals and split said one intermediate composite signal into an associated first and second signal;

a plurality of optical pairs each including an associated first and second optical link branch wherein the first branch has an output end and an input end to which is coupled a respective one of said first signals, while the associated second branch has an output end and an input end to which is coupled the second optical signal associated with said respective one of said first signal;

each optical link pair operating in a push-pull manner to drive the first signal of said respective first branch 180° out of phase with respect to the second signal of said associated second branch;

each of said first and second associated optical link branches in a respective optical link pair including:
generator means adapted to receive the signal associated with said branch and generate an optical signal representative of said signal,
optical pathway means coupled to said generator means for guiding said generated optical signal wherein said optical pathway means has an associated signal propagation delay time,
detector means adapted to receive said guided optical signal and generate a detected electrical signal representative of said guided optical signal wherein said detected signal has an associated phase shift component proportional to the propagation delay time of said respective optical pathway means, and
a delay equalization circuit coupled to said detector means for equalizing the phase shift component of said detected signal with the phase shift component of each detected signal in each remaining optical link branch of said plurality of optical link branches;

in each of said optical link pairs, a combiner means adapted to receive the respective pair of equalized detected signals of said respective optical link pairs and combine said equalized detected signals to produce a link pair output signal;

an output combiner means adapted to receive the link pair output signal from the respective combiner means of each optical link pair and combine said link pair output signals into an output signal of said optical transmission system.

9. The optical transmission system as recited in claim 8 wherein:
each of said signal splitter means includes a 180° power splitter; and
each of said combiner means includes a 180° power combiner.

10. The optical transmission system as recited in claim 8 wherein:
each of said signal splitter means includes a 180° splitter;
the detector means in each optical link branch includes a photodiode wherein for each first and second associated optical link branches in a respective optical link pair, the photodiode of said first branch has a reverse polarity with respect to the photodiode of said associated second branch; and
each of said combiner means includes a 0° power combiner.

11. The optical transmission system as recited in claim 8 wherein:
each of said signal splitter means includes a 0° power splitter;
the detector means in each optical link branch includes a photodiode wherein for each first and second associated optical link branches in a respective optical pair, the photodiode of said first branch has a reverse polarity with respect to the photodiode of said associated second branch; and
each of said combiner means includes a 180° power combiner.

12. The optical transmission system as recited in claim 8 further including in each delay equalization circuit;
a closed loop control system comprising:
an electronic delay control means having a signal input for receiving the detected signal from said respective detector means, a control input for controlling a time delay of said detected signal, and an output for providing a time-delayed version of said detected signal;
a filter network coupled to said delay control means for receiving the time-delayed detected signal and filtering out the pilot tone from the detected signal;
a phase detector responsive to a phase reference signal and the pilot output voltage proportional to the phase difference between said pilot tone and said phase reference; and
a feedback controller responsive to said phase detector output voltage for providing a control signal to the control input of said electronic delay control means for continuously adjusting the time delay of said detected signal until the phase difference between said pilot tone and said phase reference reaches a desired value.

13. The optical transmission system as recited in claim 12 further including:
in each of said delay equalization circuits, a tone splitter means coupled to said respective filter network for splitting said pilot tone into two intermediate pilot tones; and
a combiner for receiving one of said intermediate tones from the respective tone splitter means of each of said delay equalization circuits and combining said intermediate pilot tones to produce said phase reference signal.

14. The optical transmission system as recited in claim 12 wherein:
said reference signal is the pilot tone from the respective filter network of a selected one of said delay equalization circuits.

* * * * *